United States Patent
Simonato et al.

(10) Patent No.: US 9,900,935 B2
(45) Date of Patent: Feb. 20, 2018

(54) APPARATUS FOR COOKING FOOD PRODUCTS

(71) Applicant: Electrolux Professional S.p.A., Pordenone (IT)

(72) Inventors: Michele Simonato, Pordenone (IT); Alessandro Morassut, Pordenone (IT)

(73) Assignee: Electrolux Professional S.p.A., Pordenone (IT)

( * ) Notice: Subject to any disclaimer, the term of this patent is extended or adjusted under 35 U.S.C. 154(b) by 489 days.

(21) Appl. No.: 14/538,082

(22) Filed: Nov. 11, 2014

(65) Prior Publication Data
US 2015/0144619 A1 May 28, 2015

(30) Foreign Application Priority Data
Nov. 27, 2013 (EP) .................................. 13194654.3

(51) Int. Cl.
*A47J 27/04* (2006.01)
*A47J 43/18* (2006.01)
*H05B 6/64* (2006.01)
*A47J 37/06* (2006.01)

(52) U.S. Cl.
CPC .......... *H05B 6/647* (2013.01); *A47J 37/0611* (2013.01)

(58) Field of Classification Search
CPC ........... A47J 27/04; A47J 43/18; A47J 36/022
USPC ...... 99/422, 423, 425, 445, 446; 126/49, 50, 126/51, 18
See application file for complete search history.

(56) References Cited

U.S. PATENT DOCUMENTS

| | | | |
|---|---|---|---|
| 2004/0065658 A1* | 4/2004 | Damiano | A47J 36/2483 219/524 |
| 2006/0289514 A1* | 12/2006 | Baumann | A47J 36/38 219/729 |
| 2011/0062151 A1* | 3/2011 | Tassan-Mang-Ina | A47J 37/0611 219/690 |

* cited by examiner

Primary Examiner — Tu B Hoang
Assistant Examiner — Thomas Ward
(74) Attorney, Agent, or Firm — Pearne & Gordon LLP

(57) ABSTRACT

An apparatus for cooking food products includes: a first heating plate adapted to support the food products; a second heating plate adapted to face the food products during a cooking operation; a first resistive heating element associated with the first heating plate and adapted to provide heat to the food products during the cooking operation; a second resistive heating element associated with the second heating plate and adapted to provide heat to the food products during the cooking operation, and at least one microwave generator element configured to selectively generate microwave radiation for haeting the food products during the cooking operation. At least a selected resistive heating element between the first resistive heating element and the second resistive heating element is joined to a surface of the associated heating plate so that it forms a single piece with the associated heating plate.

6 Claims, 4 Drawing Sheets

APPARATUS FOR COOKING FOOD PRODUCTS

The present invention refers to the cookware field.

Widely known in the art are currently broilers, or griddles, that are used to cook food products of the most varied kind, such as hamburgers, toasted rolls, meat in general, and the like. These griddles use contact and radiated heating as a process to cook such products. For this purpose, a griddle of this type comprises at least one heating plate, for example made of chromium-plated steel, stainless steel, Teflon-coated steel or glass-ceramics, associated with one or more resistive heating elements.

A number of griddles to be found currently on the marketplace have—further to a lower or bottom heating plate on which the products to be cooked are placed—an upper or top heating plate that is adapted to be brought in proximity of the lower or bottom one so as to have the products cooked on both sides simultaneously, thereby reducing the overall time required to handle the same products.

According to solutions known in the art, a first resistive heating element may be located under the lower heating plate and a second resistive heating element may be located above the higher heating plate. This design is quite simple and effective, having the advantage of allowing an easy and fast maintenance, since the two heating plates may be easily removed for being cleaned.

Apparatuses of this kind, however, have a main drawback in that they are not capable of cooking the food products completely; in fact, such food products are usually just heated up or browned outside, while remaining substantially uncooked, i.e., in their raw state, inside. This drawback is exacerbated in case the food products to be cooked are large.

In order to solve this drawback, griddles designed to cook food products by exploiting a combination of heat produced by the resistive heating elements and heat produced by electromagnetic radiation in the microwave spectrum are also available in the market. Thanks to the action of the electromagnetic radiation in the microwave spectrum, which is able to deeply penetrate into the food products to be cooked, said apparatuses allow to evenly heat also the inner portions of such food products, improving the cooking quality and increasing the cooking speed. In order to exploit the microwave action benefits, said apparatuses have to include one or more microwave generators adapted to generate electromagnetic radiation in the microwave spectrum.

In the present description and claims with "resistive heating element" it is intended any device adapted to provide heat by exploiting the Joule effect, i.e., the generation of heat produced by the passage of electric current across a conductor material. Conversely, the electromagnetic radiation in the microwave spectrum generated by a microwave generator element is adapted to provide heat by directly causing polarized molecules in the food to rotate and build up thermal energy (said process is known as dielectric heating).

For example, U.S. Pat. No. 7,449,665, which has been filed by this same applicant, discloses an apparatus for cooking food products on both sides thereof, comprising a base member associated to a bottom heating surface, a first electric heating element located between the base member and the bottom heating surface, an upper movable member associated to a top heating surface, a second electric heating element located between said upper member and said top heating surface, and one or more microwave generators housed in the base member; when said upper member is lowered, the top heating surface comes to lie opposite to the bottom heating surface so as to form a cooking cavity therebetween. Said first electric heating element is separated from the bottom heating surface by a hollow space and the microwave generator is placed in such position, with the use of appropriate wave-guide means, as to allow the microwaves issuing therefrom to propagate towards said hollow space and, eventually, towards the bottom surface of said bottom heating surface.

The presence of electromagnetic radiation in the microwave spectrum (hereinafter simply referred to as "microwave radiation"), although capable of greatly improving the cooking quality and increasing the cooking speed, strongly increases the design complexity of the griddle. Indeed, in order to avoid that microwave radiation exits from the griddle, the griddle have to be designed in such a way to form a closed inner compartment to confine the microwave radiation when the additional heating device(s) adapted to generate microwave radiation are activated.

In order to avoid microwave radiation leakages from the griddle, known griddle arrangements require the installation of a number of microwave shielding members, adapted to efficiently confine the microwave radiations within the inner compartment by trying to occlude any interstice and slot that may occur between structural elements of the griddle that are in reciprocal contact and that delimit the inner compartment itself Example of microwave shielding members may comprise, among other things, gaskets, metallic meshes, shielding covers, and metallic frames.

The Applicant has observed that a griddle like the one previously described, designed to exploit a combination of heat produced by the heating devices and heat produced by electromagnetic radiation in the microwave spectrum for cooking food products, has a large number of different elements with corresponding relatively large number of interstices. Since said interstices require to be closed by means of several additional microwave shielding members to avoid any microwave radiation leakages, the complexity of the whole griddle structure is increased, causing a corresponding rising in the manufacturing costs.

Moreover, the presence of such a large number of interstices makes it possible that fats and food residuals penetrate inside the internal components of the griddle. Accumulation of fat can be a serious danger, as it attracts microwaves with consequent uncontrolled local heat increase, forming a so-called "hot spot". Such uncontrolled heat increase is detrimental for the griddle, since may cause the generation of holes in the inner compartment of the griddle as well as in local components thereof.

Therefore, a griddle like the one previously described should be equipped with suitable dirt protection members, such as for example with protection frames made in silicone and/or Teflon that surround the lower and the higher heating plates. Moreover, griddles of this type require to be frequently subjected to accurate cleaning operations (which cleaning operations are hindered in turn by the complexity of the structure).

In view of the above, the Applicant has handled the problem of improving the already known solutions for providing a cooking apparatus designed to exploit a combination of heat produced by the heating devices and heat produced by electromagnetic radiation in the microwave spectrum.

An aspect of the present invention provides for an apparatus for cooking food products. The apparatus comprises a first heating plate adapted to support the food products; a second heating plate adapted to face the food products during a cooking operation; a first resistive heating element associated with the first heating plate and adapted to provide heat to the food products during the cooking operation; a second resistive heating element associated with the second heating plate and adapted to provide heat to the food products during the cooking operation; and at least one microwave generator element configured to selectively generate microwave radiation for heating the food products during the cooking operation. At least a selected resistive heating element between the first resistive heating element and the second resistive heating element is joined to a first surface of the associated heating plate so that it forms a single piece with the associated heating plate.

According to an embodiment of the present invention, the selected resistive heating element is joined to the associated heating plate by means of a fastening technique achieving continuity between portions of the selected resistive heating element and portions of the associated heating plate.

According to an embodiment of the present invention, the selected resistive heating element is welded, soldered, brazed, calked, or glued to the associated heating plate.

According to an embodiment of the present invention the selected resistive heating element is the second resistive heating element, and is joined to a first surface of the second heating plate; in this case the apparatus further comprises electrical cables connected to the second resistive heating element to supply the second resistive heating element with electric power, and an internally hollow casing comprising a downward-oriented cavity housing the second resistive heating element and the second heating plate to expose a second surface of the second heating plate opposed to the first surface. Said casing is further provided with a hole for the passage of said electrical cables.

According to an embodiment of the present invention, the apparatus further comprises a hollow stem element connected to the second heating plate and passing through said hole on said casing. Said electrical cables is housed in said hollow stem element.

According to an embodiment of the present invention, the second heating plate comprises a flange element protruding from the first surface of the second heating plate and coupled with the stem element.

According to an embodiment of the present invention the second resistive heating element is an electric resistor shaped to substantially surround the flange element.

According to an embodiment of the present invention the second resistive heating element has the shape of a substantially squared frame and comprises a first end portion and a second end portion bent to extend toward the centre of the flange element, and comprises a first terminal located on the first end portion and a second terminal located on the second end portion. Said electrical cables are connected to said first and second terminals.

According to an embodiment of the present invention the apparatus further comprises a temperature sensor connected to the second heating plate for sensing the temperature actually reached by said second heating plate during the cooking operation.

According to an embodiment of the present invention the second heating plate is further provided with a sensor support member located on a portion of the second heating plate encircled by the flange element. The sensor support member is adapted to support the temperature sensor so that the temperature sensor is enclosed in a cavity delimited by the flange element and by the inner surface of the hollow stem element.

Figure 1:
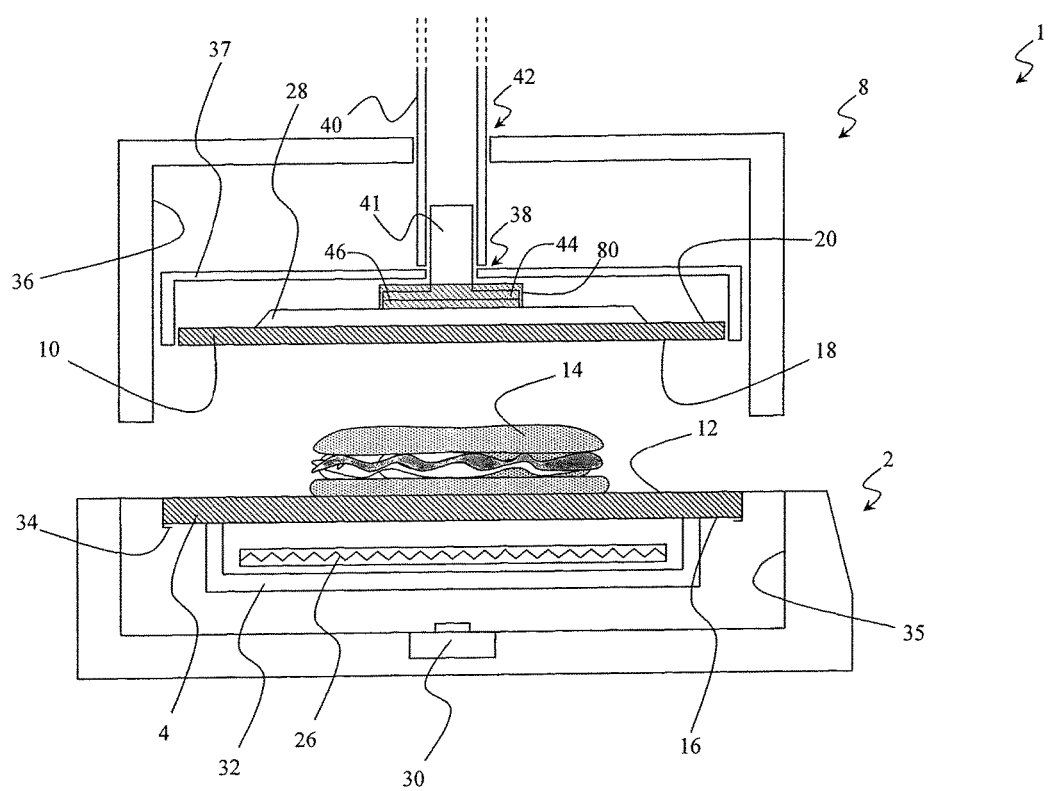
FIG. 1 is a side sectional view of an apparatus for cooking food with the upper member thereof raised in a resting position according to an embodiment of the present invention.
Figure 2:
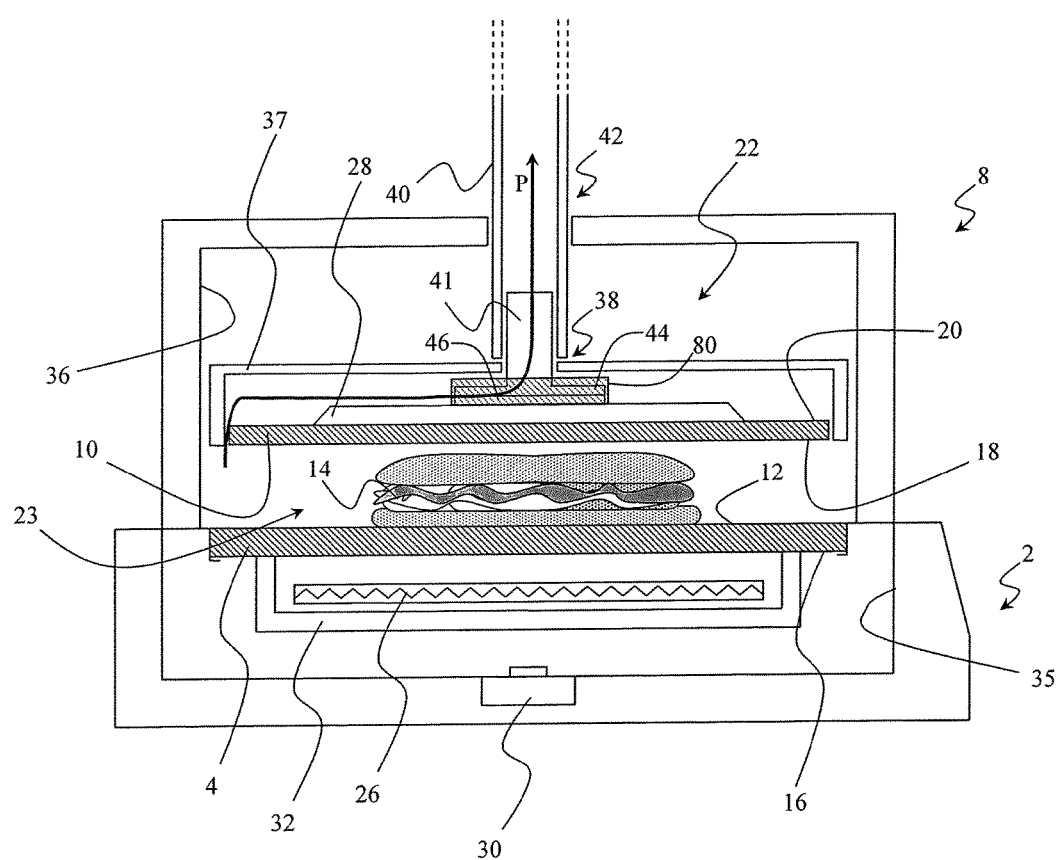
FIG. 2 is a side sectional view of the apparatus of FIG. 1 with the upper member thereof lowered into a cooking position.

With reference to the drawings, FIGS. 1 and 2 are side sectional views of an apparatus 1 for cooking food products on both sides thereof, such as a griddle, according to an embodiment of the present invention. The apparatus 1 comprises a base member 2 associated to a bottom heating plate 4, and an upper member 8 associated to a top heating plate 10. The bottom heating plate 4 comprises a top surface 12 adapted to support food products 14 to be cooked and an opposite bottom surface 16. The top heating plate 10 comprises a bottom surface 18 adapted to face the food products 14 supported by the bottom heating plate 4 during the cooking operations, and an opposite top surface 20. The bottom heating plate 4 is located on top of the base member 2 and the top heating plate 10 is located at the bottom of the upper member 8.

Advantageously, the upper member 8 is pivotally joined (in a way that is not shown) to the base member 2 so that the upper member 8 may be moved from a raised, resting position (see FIG. 1), in which the upper member 8 is spaced apart from the base member 2, to a lowered, cooking position (see FIG. 2), in which said upper member 8 and said base member 2 are closed against each other, and vice versa.

The kind of movement needed to lower the upper member 8 onto the base member 2 can for instance be a rotary one about a hinging pin provided on the base member 2 or a simple translational one, or a combination of both. Anyway, these details shall not be explained any further, owing to them being generally and widely known to all those skilled in the art.

Said base member 2 and said upper member 8, when closed against each other in the cooking position as illustrated in FIG. 2, are adapted to define—in the volume comprised therebetween—an inner compartment 22 housing both the bottom and top heating plates 4, 10. Moreover, when said base member 2 and said upper member 8 are closed against each other in the cooking position, a cooking cavity 23 is formed wherein food products 14 are actually cooked. Said cooking cavity 23 is delimited from above by the bottom surface 18 of the top heating plate 10, and from below by the top surface 12 of the bottom heating plate 4.

The base member 2 comprises one or more bottom resistive heating elements 26 (one, in the figures) arranged under the bottom heating plate 4, and the upper member 8 comprises one or more top resistive heating elements 28 (one, in the figures) fastened on the top surface 20 of the top heating plate 10.

Preferably, but not necessarily, the bottom heating plate 4 and the top heating plate 10 are made of a material that is resistant to high temperatures and transparent or partially transparent (like quartz) to infrared radiation, so that heat produced by the bottom resistive heating element 26 and/or the top resistive heating element 28 is able to reach the food 14 supported by the bottom heating plate 4. Nevertheless, for the top heating plate 10 a material that is not transparent to infrared radiation can be used as well, as aluminum coated with Teflon. The apparatus 1 further comprises, inside said base member 2, one or more (one, in the figures) microwave generator elements 30 configured to generate microwave radiation to be fed into the cooking cavity 23 for heating the food 14 supported by the bottom heating plate 4. The microwave generator elements 30 are preferably located under and/or at the sides of the bottom heating plate 4, with the bottom heating plate 4 that is advantageously made of a material that is also transparent to microwave radiation.

Expediently, the base member 2 comprises a partition element 32 made of thermally insulating but microwave transparent material, such as a ceramic material, which is arranged so as to extend in a position below the bottom resistive heating device 26 for thermally insulating the electric/electronic components housed in the base member 2 from the heat generated by bottom resistive heating device 26 while at the same time allowing microwaves generated by the microwave generator element 30 to pass therethrough without any attenuating effect whatsoever. The bottom heating plate 4 is supported upon said base member 2 above said partition element 32 by providing said base member 2 with suitable support contours 34.

The base member 2 and the upper member 8 may be made of a metallic material so as to form a corresponding lower microwave shielding semi-shell 35 and a corresponding upper microwave shielding semi-shell 36, respectively, designed and arranged to ensure that, once said base member 2 and said upper member 8 are closed against each other in the cooking position, the microwave radiation generated by the microwave generator element 30 is confined within the inner compartment 22 of the apparatus 1. Alternatively, the base member 2 and/or the upper member 8 may be made of a non metallic material, such as plastic, with the inner walls thereof that are metalized so that, once the base member 2 and the upper member 8 are closed against each other in the cooking position, the microwave radiation generated by the microwave generator element 30 is still confined within the inner compartment 22 of the apparatus 1.

The top heating plate 10 is housed in a casing 37 supported by the upper member 8. The casing 37 is internally hollow to form a downward-oriented cavity adapted to contain both the top heating plate 10 and the top resistive heating element 28, with the bottom surface 18 of the top heating plate 10 that is exposed from the casing 37. A hole 38 is provided on the top surface of the casing 37 through which a tubular element 40—adapted to house electrical cables (not illustrated) to supply the resistive heating element 28 with electric power—passes for reaching the upper portion of the upper member 8. Through a hole 42 provided on the upper portion of the upper member 8, said tubular element 40 housing electrical cables exits the apparatus 1 for being connected to a power supply unit (not illustrated), for example located on the back of the base member 2. For example, the tubular element 40 is a flexible tube coupled to the top heating plate 10 by coaxially fitting itself around a corresponding metallic hollow stem element 41 that is connected to the top heating plate 10 and passes as well through the hole 38 on the casing 37.

Thanks to the presence of both the resistive heating elements 26, 28 and the microwave generator element 30, the apparatus 1 is in this way adapted to process any food product 14 that is placed upon said bottom heating plate 4 by both thermal effect, i.e. by grilling it under radiated heat, and microwave heating effect.

In fact, upon placing said food product 14 thereupon, all it takes is lowering said upper member 8 so as to close it in on said base member 2 and ensure that the thereby automatically formed inner compartment 22 features a tightly sealed construction enclosing the cooking cavity 23, and the cooking cavity 23 can in addition be both irradiated, i.e., hit by the infrared radiation emitted by the two resistive heating elements 26 and 28 from both opposite sides of the food product 14 being exposed, and reached by the propagating microwave radiation that pass through said partition element 32 and bottom heating plate 4 in an ascending flow pattern. In order to better confine microwave radiation within the inner compartment 22, the top heating plate 10 is advantageously made of a material that is also non-transparent to microwave radiation.

Figure 3:
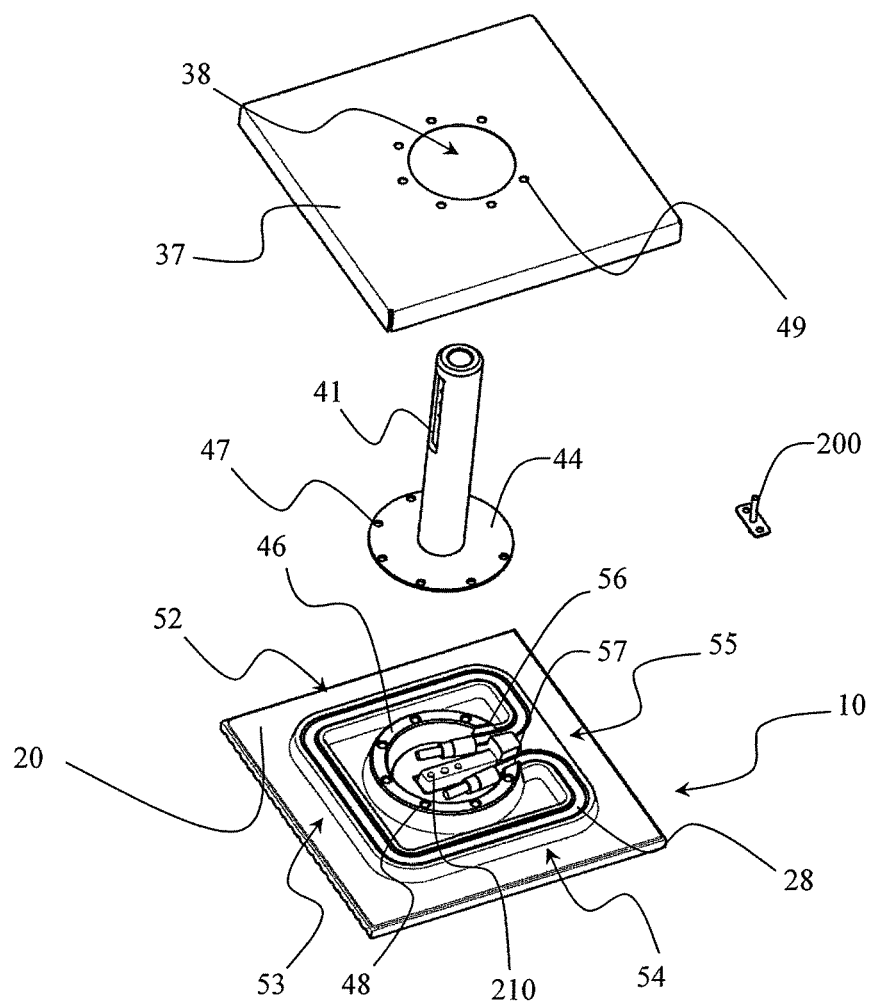
FIG. 3 is an exploded view of a portion of the apparatus of FIGS. 1 and 2 according to an embodiment of the present invention.

FIG. 3 is an exploded view of a portion of the apparatus 1 of FIGS. 1 and 2 comprising the top heating plate 10—with the top resistive heating element 28 fastened to the top surface 20 thereof—, the stem element 41, and the casing 37 according to an embodiment of the present invention.

According to an embodiment of the present invention, the stem element 41 is provided at the bottom thereof with a flange element 44. The top heating plate 10 comprises a corresponding flange element 46 adapted to be fastened to the flange element 44 for the coupling of the top heating plate 10 with the stem element 41 (see FIGS. 1 and 2). The flange elements 44 and 46 are circular, with the flange element 46 that has the shape of a circular frame upwardly protruding from the top surface 20 of the top heating plate 10. The flange elements 44 and 46 are provided with a plurality of corresponding holes 47, 48, respectively, adapted to receive screws or rivets or pins, or similar fastening elements. Similarly, the casing 37 is provided, around the hole 38 which the stem element 41 and the tubular element 40 are adapted to pass through, with a plurality of corresponding holes 49 adapted to receive screws or rivets or pins, or similar fastening elements. The arrangement of the holes 47, 48 and 49 is designed in such a way that, once the stem element 41 is leant against the top heating plate 10 with the flange element 44 in contact with the flange element 46, and the casing 37 is fitted on the top heating plate 10 with the stem element 41 through the hole 38, such holes 47, 48 and 49 results to be aligned, for being crossed by same crews or rivets or pins, or similar fastening elements in order to form the assembly housed in the upper member 8 of FIGS. 1 and 2. Similar considerations apply if the flange elements 44 and 46 have a different shape, such as for example if they are square-shaped, and/or if instead of the flange element 44 the stem element 41 is provided with a different coupling member, such as a mounting jig.

According to an embodiment of the present invention, the top resistive heating element 28 is joined to the top surface 20 of the top heating plate 10 so that the top resistive heating element 28 and the top heating plate 10 form a single piece. According to an embodiment of the present invention, the top resistive heating element 28 and the top heating plate 10 are joined together by means of a fastening technique capable of achieving continuity (i.e. to avoid the presence of any interstice, gap or interruption) between the top resistive heating element 28 and the top heating plate 10, such as by means of welding, soldering, brazing, calking (i.e., by forming an hermetic coupling between the top resistive heating element 28 and the top heating plate 10 through plastic deformation of the top heating plate 10 and/or of the top resistive heating element 28), or by means of conductive gluing. In other words, there is a continuity of material between the two pieces so that they are inseparable. Conversely, if the top resistive heating element 28 was fastened to the top heating plate 10 by means of pins, screws, rivets, and/or snap-fit coupling elements, the top resistive heating element 28 and the top heating plate 10 would not form a single piece, since said pins, screws, rivets, and/or snap-fit coupling elements are not capable of achieving continuity between the top resistive heating element 28 and the top heating plate 10, leaving instead corresponding interstices therebetween.

Figure 4:
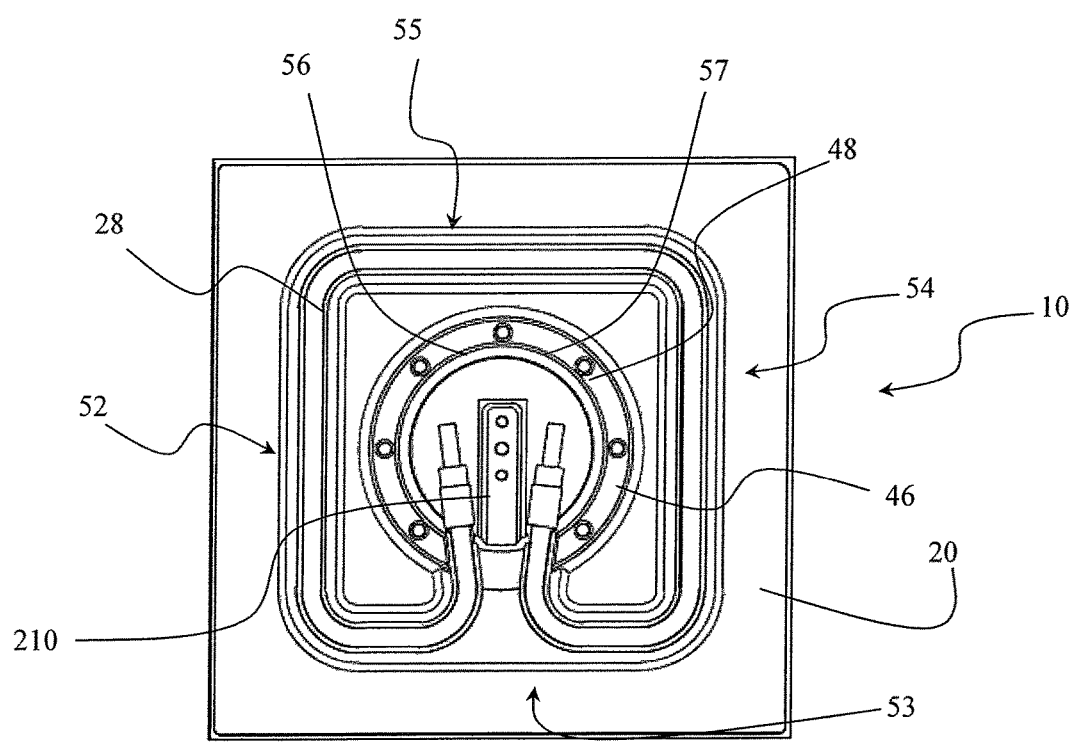
FIG. 4 is a top view of a top heating plate of FIG. 3 according to an embodiment of the present invention.

FIG. 4 is a top view of the top heating plate 10 with the top resistive heating element 28 fastened to the top surface 20 thereof according to an embodiment of the present invention.

The top resistive heating element 28 is a metallic electrical resistor, such as an armoured resistor, having the shape of a substantially squared frame, that is fastened to the top surface 20 of the top heating plate 10—by means of one among welding, soldering, brazing, calking or conductive gluing—in such a way to surround the flange element 46. Similar considerations apply in case the top resistive heating element 28 has a different shape, such as for example a circular one. In order to reduce the occurrence of thermal stresses, the material of the top resistive heating element 28 is advantageously selected in such a way to exhibit a thermal deformation response similar to the one of the material of the top heating plate 10.

In the embodiment of the invention illustrated in FIG. 3, the top resistive heating element 28 is shaped to comprise a first portion 52 parallel to a first border of the top heating plate 10, a second portion 53 perpendicular to the first portion 52, a third portion 54 parallel to, and facing the, first portion 52, and a fourth portion 55 facing the second portion 53 and comprising in turn a first end portion 56 and a second end portion 57 bent to extend toward the centre of the flange element 46 in a direction substantially parallel to the first and third portions 52, 54.

The top resistive heating element 28 comprises a first terminal located on the first end portion 56 and a second terminal located on the second end portion 57, which are adapted to be connected to the electrical cables (not illustrated in figures) for supplying electric power to the top resistive heating element 28. As already described above, once the steam element 41—top heating plate 10—casing 37 assembly is formed, and the tubular element 40 is coaxially fitted around the steam element 41, said electrical cables are housed inside the stem element 41 and then inside the tubular element 40 (see FIGS. 1 and 2).

Compared to the know solutions, wherein the top resistive heating element is coupled to the top heating plate by means of mechanical fasting elements—such as pins, screws, rivets, and/or snap-fit coupling elements—the solution according to the present invention, in which the top resistive heating element 28 is joined to the top heating plate 10 to form a single piece by means of a fastening technique capable of achieving continuity between portions of the top resistive heating element 28 and portions of the top heating plate 10—such as by means of welding, soldering, brazing, calking, or by means of conductive gluing—features several advantages.

The solution according to the embodiments of the invention is simpler compared to the known solutions, since it does not require to mount the top resistive heating element to the top heating plate by means of mechanical fastening elements to be inserted in corresponding seats provided both on the resistive heating element and on the heating plate, strongly reducing the duration and the costs of the assembly operations.

Moreover, with the solution according to the embodiments of the present invention it is possible to easily install on the heating plate resistive heating elements of different types and different sizes without having to drastically alter the assembly operations, being sufficient to weld, solder, braze, calk or glue the new resistive heating element on the heating plate.

In order to avoid microwave radiation leakages from the apparatus, known griddle arrangements require the installation of a number of microwave shielding members, such as gaskets, metallic meshes, shielding covers, and metallic frames, adapted to efficiently confine microwave radiations. Said microwave shielding members should be arranged within the inner compartment of the griddle in such a way to occlude interstices and slots that may occur between structural elements of the griddle that are in reciprocal contact, to interrupt (from a microwave radiation propagation point of view) possible paths directed outside the apparatus.

The peculiar way the top resistive heating element 28 is joined to the top heating plate 10 to form a single piece, as well as the way the stem element 41 is connected to the top heating plate 10 according to the embodiments of the present invention, allow to strongly reduce the number of microwave shielding elements required to avoid that microwave radiation leakages from the apparatus 1.

Indeed, making reference to FIG. 2, since according to the embodiments of the present invention there is continuity between the top resistive heating element 28 and the top heating plate 10, the interstices through which microwave radiation may leakage are strongly reduced. Indeed, according to the present invention, the only path through which microwave radiation propagating from the cooking cavity 23 toward the top heating plate 10 may substantially penetrate for exiting the apparatus 1 is the path P passing through the interstice between the lateral sides of the casing 37 and the lateral sides of the top heating plate 10, passing through the interstice between the flange elements 44, 46, reaching the internal of the stem element 41 and then advancing inside the tubular element 40.

Therefore, according to an embodiment of the present invention, in order to avoid that microwave radiation leakages from the apparatus 1 it is sufficient to provide a microwave shielding element 80 covering the interstice between the flange elements 44, 46, such as a metallic mesh fitted around the flange elements 44, 46.

Compared to the known griddle arrangements, the apparatus 1 according to the embodiments of the present invention is more compact, and requires a reduced number of elements to be assembled. Therefore, also the maintenance and the cleaning operations are greatly simplified.

Moreover, since the apparatus 1 according to the embodiments of the present invention comprises a reduced number of interstices, the possible formation of hot spots (caused by accumulation of fats and food residuals) capable of attracting microwaves with consequent dangerous uncontrolled local heat increase is strongly reduced. For example, thanks to the compact arrangement of the apparatus 1 according to the embodiments of the invention, the presence of a dirt protection member, such as a silicon and/or Teflon protection frame, surrounding the top heating plate 10 may be neglected.

Since according to the embodiments of the invention there is continuity between portions of the top resistive heating element 28 and portions of the top heating plate 10, the thermal exchange between the top resistive heating element 28 and the top heating plate 10 is greatly improved compared to the known solutions.

Making reference to FIGS. 3 and 4, according to an embodiment of the present invention, a temperature sensor 200 may be advantageously installed on the top heating plate 10 for sensing the temperature actually reached by the top heating plate 10 during the cooking operations, for example in order to allow an on/off thermostatic control of the top heating plate 10 temperature. For this purpose, according to an embodiment of the present invention, the top heating plate 10 is provided with a sensor support member 210 protruding from a portion of the top surface 20 of the top heating plate 10 encircled by the flange element 46 and comprising seats adapted to receive the temperature sensor 200. In this way, once the temperature sensor 200 is connected to the support member 210 and the stem element 41 is connected to the top heating plate 10, the temperature sensor 200 is housed inside a metallic cavity, delimited by the flange elements 44, 46 and by the inner surface of the stem element 41, capable of shielding microwave radiations. In this way, according to an embodiment of the present invention the temperature sensor 200 is already advantageously protected from the microwave radiations without the need of providing any additional and dedicated microwave radiation protection structure. The temperature sensor 200 is connected—for being supplied and for exchanging data—to corresponding electric cables (not illustrated in the figures) housed within the tubular element 40.

According to an embodiment of the present invention, the bottom surface 18 of the top heating plate 10 may be advantageously covered with a protective coating made of a high-temperature resistant material exhibiting a good chemical inertia and a high nonstick property, as well as capable of efficiently limiting any thermal barrier effect, such as a ceramic coating.

Naturally, in order to satisfy local and specific requirements, a person skilled in the art may apply to the solution described above many logical and/or physical modifications and alterations.

For example, similar considerations apply if more than one top resistive heating elements are joined to the top surface of the top heating plate.

Moreover, although this solution has been described with a certain degree of particularity with reference to the case in which the resistive heating element that is welded, soldered, brazed, calked, or glued is the top resistive heating element, similar considerations apply in case the bottom resistive heating element (or also more than one bottom resistive heating elements) is welded, soldered, brazed, calked or glued to the bottom surface of the bottom resistive heating element. Mixed solutions are also contemplated, in which at least one resistive heating element is welded, soldered, brazed, calked or glued to the top surface of the top heating plate, and at the same time at least one resistive heating element is welded, soldered, brazed, calked or glued to the bottom surface of the bottom heating plate.

Moreover, the concepts of the present invention can be applied as well to top resistive heating elements and top heating plates having a shape different from the one illustrated in FIGS. 3 and 4, such as for example a circular shape. Preferably, the shape and the size of the top resistive heating element are designed taking into account the shape and the size of the top heating plate, in order to increase the uniformity with which heat generated by the top resistive element distributes across the top heating plate.

The invention claimed is:

1. An apparatus for cooking food products, the apparatus comprising:
    a first heating plate adapted to support the food products;
    a second heating plate adapted to face the food products during a cooking operation;
    a first resistive heating element associated with the first heating plate and adapted to provide heat to the food products during the cooking operation;
    a second resistive heating element associated with the second heating plate and adapted to provide heat to the food products during the cooking operation, and
    at least one microwave generator element configured to selectively generate microwave radiation for heating the food products during the cooking operation, wherein the second resistive heating element is joined to a first surface of the second heating plate so that it forms a single piece with the second heating plate, the apparatus further comprising:
    electrical cables connected to the second resistive heating element to supply the second resistive heating element with electric power;
    an internally hollow casing comprising a downward-oriented cavity housing the second resistive heating element and the second heating plate to expose a second surface of the second heating plate opposed to the first surface, said casing being further provided with a hole for the passage of said electrical cables; and
    a hollow stem element connected to the second heating plate and passing through said hole on said casing, said electrical cables being housed in said hollow stem element, wherein the second heating plate comprises a flange element protruding from the first surface of the second heating plate and coupled with the stem element, and wherein the second resistive heating element is an electric resistor shaped to substantially surround the flange element.

2. The apparatus of claim 1, wherein the second resistive heating element is joined to the second heating plate by means of a fastening technique achieving continuity between portions of the second resistive heating element and portions of the second heating plate.

3. The apparatus of claim 1, wherein the second resistive heating element is:
    welded;
    soldered;
    brazed;
    calked; or
    glued
to the second heating plate.

4. The apparatus of claim 1, wherein the second resistive heating element:
    has the shape of a substantially squared frame and comprises a first end portion and a second end portion bent to extend toward the centre of the flange element, and
    comprises a first terminal located on the first end portion and a second terminal located on the second end portion, said electrical cables being connected to said first and second terminals.

5. The apparatus of claim 1, further comprising a temperature sensor connected to the second heating plate for sensing the temperature actually reached by said second heating plate during the cooking operation.

6. The apparatus of claim 5, wherein the second heating plate is further provided with a sensor support member located on a portion of the second heating plate encircled by the flange element, the sensor support member being adapted to support the temperature sensor so that the temperature sensor is enclosed in a cavity delimited by the flange element and by the inner surface of the hollow stem element.

* * * * *